(12) United States Patent
Matsumoto

(10) Patent No.: US 11,277,533 B2
(45) Date of Patent: Mar. 15, 2022

(54) IMAGE READING APPARATUS AND IMAGE FORMING APPARATUS

(71) Applicant: CANON KABUSHIKI KAISHA, Tokyo (JP)

(72) Inventor: Akira Matsumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/145,428

(22) Filed: Jan. 11, 2021

(65) Prior Publication Data
US 2021/0243318 A1    Aug. 5, 2021

(30) Foreign Application Priority Data
Feb. 4, 2020  (JP) .............................. JP2020-017441

(51) Int. Cl.
*H04N 1/00* (2006.01)
*H04N 1/12* (2006.01)

(52) U.S. Cl.
CPC ..... *H04N 1/00602* (2013.01); *H04N 1/00588* (2013.01); *H04N 1/1215* (2013.01)

(58) Field of Classification Search
CPC ............... H04N 1/0062; H04N 1/1215; H04N 1/00602; H04N 1/00628; H04N 1/0057; H04N 1/00588; H04N 1/00572; H04N 1/203; H04N 2201/0081; H04N 1/00631; H04N 1/0058; H04N 1/00596; H04N 1/0061; H04N 1/04; H04N 1/0464; H04N 1/1017; H04N 1/12; H04N 1/121; H04N 1/125; H04N 1/193; H04N 1/2032; H04N 2201/044; H04N 1/00681; H04N 1/00013; H04N 1/00037; H04N 1/00543; H04N 1/00591; H04N 1/00615; H04N 1/00633; H04N 1/0066; H04N 1/00724; H04N 1/00612; H04N 1/00713; H04N 1/00734; H04N 1/00745; H04N 1/00058; H04N 1/0035; H04N 1/00389; H04N 1/00567; H04N 1/00687; H04N 1/00761; H04N 2201/0434; B65H 2220/01; B65H 2220/02; B65H 2511/514; B65H 2515/34; B65H 3/56; B65H 2220/11; B65H 2511/242; B65H 2405/1117; B65H 2511/24; B65H 2701/1311; B65H 2701/1315; B65H 1/04;
(Continued)

(56) References Cited

U.S. PATENT DOCUMENTS 6,168,146 B1 *  1/2001  Komuro ............... B65H 3/5261
                                                        271/10.12
7,667,879 B2    2/2010  Makino et al.
(Continued)

FOREIGN PATENT DOCUMENTS

JP        2004-297780 A      10/2004

*Primary Examiner* — Negussie Worku
(74) *Attorney, Agent, or Firm* — Venable LLP

(57) ABSTRACT

An image reading apparatus includes a rotatable feeding member, an image portion, a feeding guide, a first driven rolling member, and a second driven rolling member. The first driven rolling member and a second driven rolling member provided downstream of the first driven rolling member with respect to a sheet feeding direction are provided in overlapping directions as seen in an axial direction of the rotatable feeding member and are provided in non-overlapping directions as seen in the sheet feeding direction.

16 Claims, 6 Drawing Sheets

(58) Field of Classification Search
CPC .. B65H 1/06; B65H 2220/03; B65H 2511/10; B65H 2511/214; B65H 2511/51; B65H 2513/40; B65H 2801/06; B65H 3/063; B65H 3/5238; B65H 3/0661; B65H 1/022; B65H 1/08; B65H 1/266; B65H 2220/08; B65H 2301/3613; B65H 2404/1424; B65H 2405/1136; B65H 2405/114; B65H 2405/12; B65H 2601/11; B65H 2601/321; B65H 2801/39; B65H 35/04; B65H 3/0684; B65H 45/18; B65H 5/062; B65H 7/10; B65H 9/002; B65H 2301/4212; B65H 2402/5441; B65H 2403/721; B65H 2404/14212; B65H 2553/42; B65H 3/5215; B65H 3/5223; B65H 9/103; B65H 9/20; B65H 2301/163; B65H 2301/33312; B65H 2301/51256; B65H 2402/46; B65H 2403/533; B65H 2403/60; B65H 2403/73; B65H 2403/732; B65H 2404/1115; B65H 2405/1111; B65H 2405/1112; B65H 2405/1114; B65H 2405/11151; B65H 2405/141; B65H 2405/313; B65H 2408/1222; B65H 2408/125; B65H 2801/27; B65H 29/14; B65H 29/52; B65H 31/26; B65H 31/34; B65H 3/047; B65H 3/0607; B65H 3/66; B65H 5/025; B65H 5/36; B65H 85/00; B65H 2402/31; B65H 2403/72; B65H 2404/133; B65H 2404/14211; B65H 2404/1441; B65H 2404/611; B65H 2404/623; B65H 2405/324; B65H 2405/3322; B65H 2553/44; B65H 2701/1912; B65H 2801/12; B65H 31/02; B65H 3/0653; B65H 3/0669; B65H 3/5284; B65H 3/68; B65H 43/00; B65H 7/06; B65H 7/12; B65H 9/006
USPC .......................................................... 358/498
See application file for complete search history.

(56) References Cited

U.S. PATENT DOCUMENTS

| | | | |
|---|---|---|---|
| 7,835,672 B2 * | 11/2010 | Sakamoto | G03G 15/0822 399/254 |
| 8,837,019 B2 | 9/2014 | Matsumoto | |
| 9,860,403 B2 | 1/2018 | Matsumoto et al. | |
| 2004/0207887 A1 | 10/2004 | Makino et al. | |
| 2011/0127712 A1 * | 6/2011 | Komuro | B65H 3/0684 271/110 |
| 2013/0201537 A1 * | 8/2013 | Fujiwara | H04N 1/0066 358/498 |
| 2018/0118481 A1 * | 5/2018 | Sakurai | G03G 15/6514 |
| 2019/0037092 A1 * | 1/2019 | Shiota | H04N 1/00734 |
| 2019/0144219 A1 * | 5/2019 | Tateishi | B65H 3/54 271/93 |
| 2019/0253564 A1 * | 8/2019 | Koyanagi | H04N 1/00092 |
| 2020/0382668 A1 | 12/2020 | Matsumoto | |
| 2020/0382674 A1 | 12/2020 | Matsumoto | |
| 2021/0107754 A1 * | 4/2021 | Fujii | H04N 1/00602 |
| 2021/0261368 A1 * | 8/2021 | Fujii | B65H 3/0669 |

* cited by examiner

IMAGE READING APPARATUS AND IMAGE FORMING APPARATUS

FIELD OF THE INVENTION AND RELATED ART

The present invention relates to an image forming apparatus for reading an image and to an image forming apparatus for forming the image, read by the image reading apparatus, on a recording material.

In the image reading apparatus, when a sheet is fed by using a feeding passage including a curved feeding path, a feeding resistance of the sheet is increased by a slide of the sheet fed by a guiding member constituting the curved feeding path. In such an image reading apparatus, as disclosed in Japanese Laid-Open Patent Application (JP-A) 2004-297780, in order to alleviate the feeding resistance, a constitution in which the guiding member is provided with a plurality of roller members rotated by the guiding member is disclosed.

In recent years, in order to realize downsizing of the image reading apparatus, it is required that curvature of flexure of the feeding passage is increased and a feeding distance is shortened. However, in the case where the roller members rotated by the guiding member are arranged in a line in an axial direction as in the image reading apparatus disclosed in JP-A 2004-297780, there was a liability that an attitude of the sheet becomes unstable by the curved feeding path and the roller members and thus it becomes difficult to stably feed the sheet.

SUMMARY OF THE INVENTION

A principal object of the present invention is to provide an image reading apparatus capable of stably feeding a sheet and of satisfactorily read an image on the fed sheet in the case of including a curved feeding passage.

According to an aspect of the present invention, there is provided an image reading apparatus comprising: a rotatable feeding member configured to feed a sheet; reading unit configured to read, at a reading position, an image on the sheet fed by the rotatable feeding member; a feeding guide provided between the rotatable feeding member and the reading position with respect to a feeding direction of the sheet and configured to define an inside of a curved feeding passage as seen in an axial direction of the rotatable feeding member; a first driven rolling member projecting from the feeding guide and rotatable by contact with the sheet fed by the rotatable feeding member; and a second driven rolling member projecting from the feeding guide and including a rotation center provided downstream of a rotation center of the first driven rolling member with respect to the feeding direction, wherein the second driven rolling member is rotatable by contact with the sheet fed by the rotatable feeding member, wherein the first driven rolling member and the second driven rolling member are provided in overlapping directions as seen in the axial direction and are provided in non-overlapping directions as seen in the feeding direction.

Further features of the present invention will become apparent from the following description of exemplary embodiments with reference to the attached drawings.

DESCRIPTION OF THE EMBODIMENTS

Figure 1A:
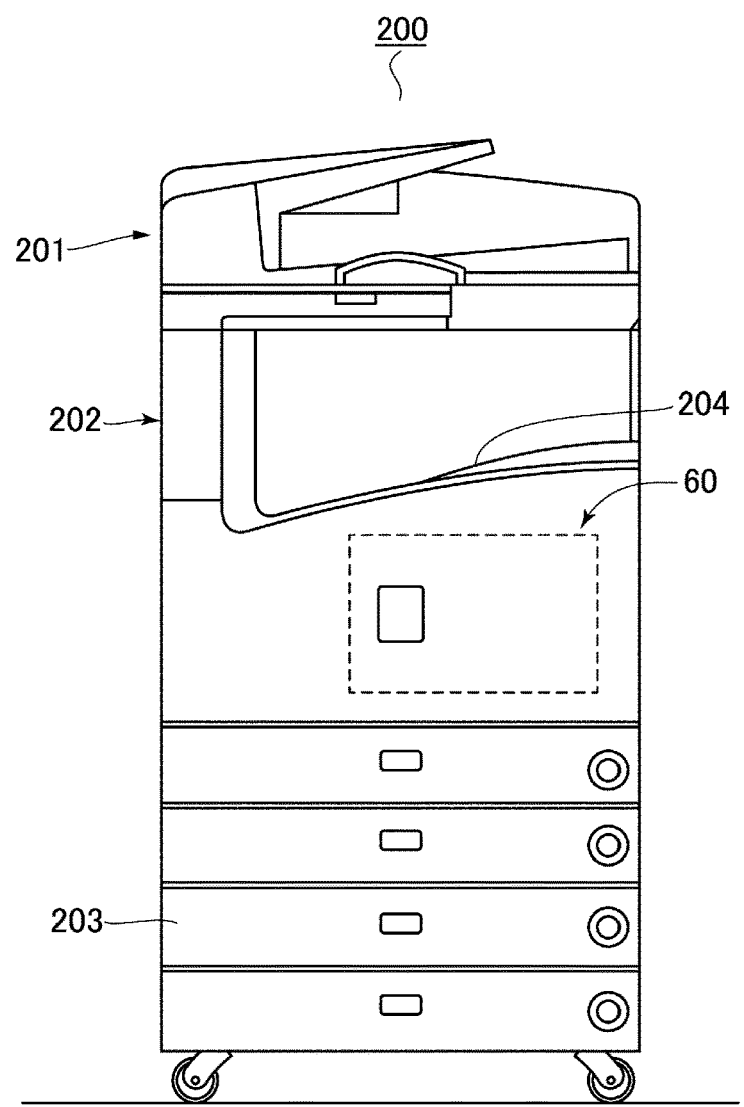
FIG. 1A is a front view of an image forming apparatus according to an embodiment.
Figure 1B:
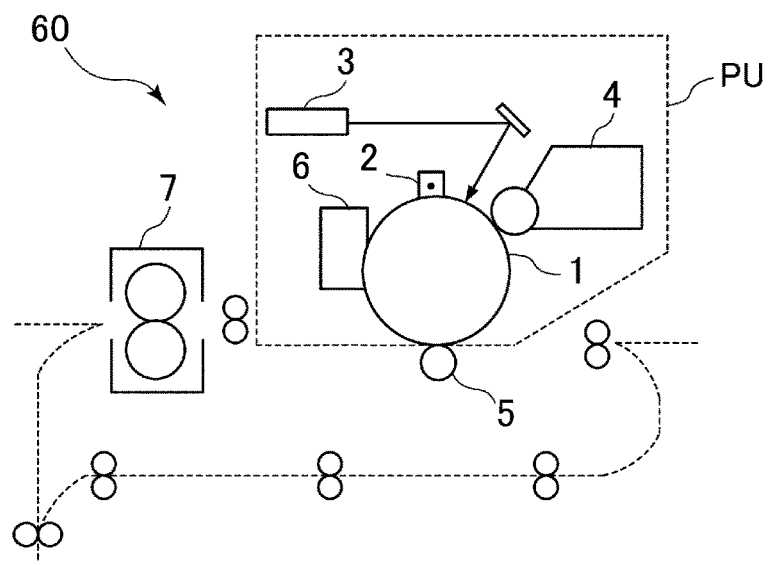
FIG. 1B is a schematic view of an image forming engine.

In the following, embodiments according to the present invention will be described specifically with reference to FIGS. 1 to 6. First, a general structure of an image forming apparatus 200 according to an embodiment will be described using FIGS. 1A and 1B. FIG. 1A is a front view of the image forming apparatus 200 of an electrophotographic type, and FIG. 1B is a schematic view of an image forming engine 60 of the image forming apparatus 200.

[Image forming apparatus]

As shown in FIG. 1A, the image forming apparatus 200 includes an image forming portion 202 including the image forming engine 60 for forming an image on recording paper (recording material) and includes a sheet (paper) feeding cassette 203 which is mounted below the image forming portion 202 and in which sheets of the recording paper are stacked. Further, the image forming apparatus 200 includes an image reading apparatus 201, mounted on the image forming portion 202, for reading an image of an original.

The image forming portion 202 includes an image forming means disposed at a substantially central portion thereof. Under the image forming portion 202, a sheet (paper) feeding means, including the sheet feeding cassette 203, for feeding the recording paper is provided. On the image forming portion 203, the image reading apparatus 201, including a CCD or the like, as a reading unit for reading the image of the original is provided. Further, the image forming apparatus 200 includes a space between the image reading apparatus 201 and the image forming portion 202, and this space constitutes a main assembly sheet (paper) discharging portion 204 for discharging and stacking sheets of the recording paper fed from the image forming portion 202.

The image forming engine 60 of the image forming portion 202 includes, as shown in FIG. 1B, an image forming unit PU as an image forming part of an electrophotographic type and a fixing device 7. When an instruction to start an image forming operation is provided, a photosensitive drum 1 which is a photosensitive member rotates, and a drum surface thereof is electrically charged by a charging device 2. Then, an exposure device 3 modulates and outputs laser light on the basis of image data sent from the image reading apparatus 201 or an external computer, and scans the surface of the photosensitive drum 1 with the laser light, so that an electrostatic latent image is formed. This electrostatic latent image is visualized (developed) into a toner image by toner supplied from a developing device 4.

In parallel to such an image forming operation, a feeding operation for feeding, toward the image forming engine 60, the recording paper stacked in the sheet feeding cassette is executed. The fed recording paper is conveyed in conformity to progress of the image forming operation performed by the image forming unit PU. Then, the toner image carried on the photosensitive drum 1 is transferred onto the recording paper by a transfer roller 5. The toner remaining on the photosensitive drum 1 after toner image transfer onto the recording paper is collected by the cleaning device 6. The recording paper on which the (unfixed) toner image is transferred is delivered to the fixing device 7 and is heated and pressed by being nipped by a roller pair. The toner is melted and fixed on the recording paper, and then the recording paper on which the image is fixed is discharged onto the main assembly discharge portion 204 by a discharging means such as a discharging roller pair.

[Image reading apparatus]

Figure 2:
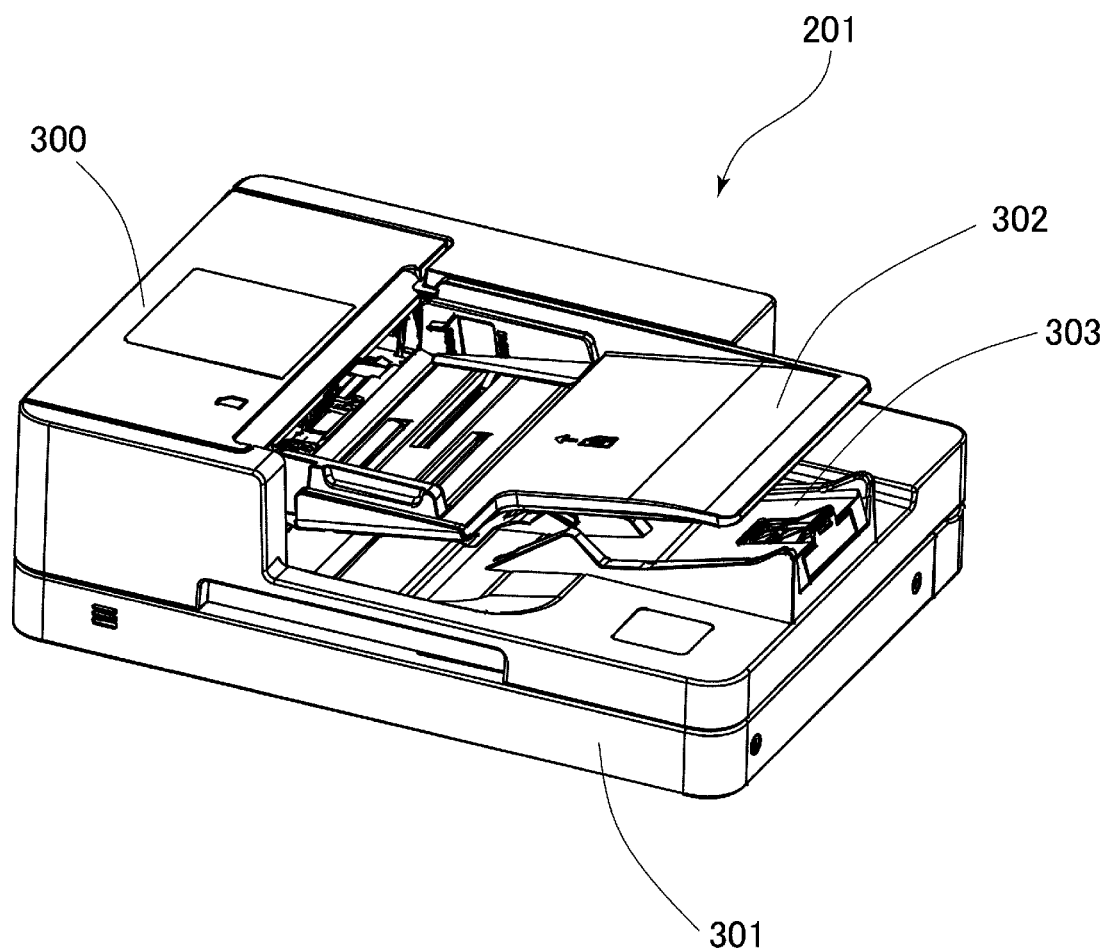
FIG. 2 is a perspective view of an image reading apparatus according to the embodiment.

FIG. 2 is a perspective view of the image reading apparatus 201 of this embodiment. As shown in FIG. 2, the image reading apparatus 201 includes an ADF (Auto Document Feeder) 300 for separating and feeding a plurality of sheets of originals and for reading images printed on the originals. The ADF 300 includes a sheet feeding guide tray 302 for stacking thereon sheets to be fed and a sheet discharge tray 303 for separating and feeding the sheets stacked on the sheet feeding tray 302 and for conveying and discharging the sheets. Under the ADF 300, a reader 301 for reading an image of an original fed by the ADF 300 or for reading an image of a thick original such as a book after the openable ADF 300 is opened is provided.

Incidentally, in the following, the sheet includes, in addition to plain paper, special paper such as coated paper, a special-shaped recording material such as an envelope or index paper, a plastic film for an overhead projector, a cloth, and the like, and the original is also an example of the sheet.

Figure 3:
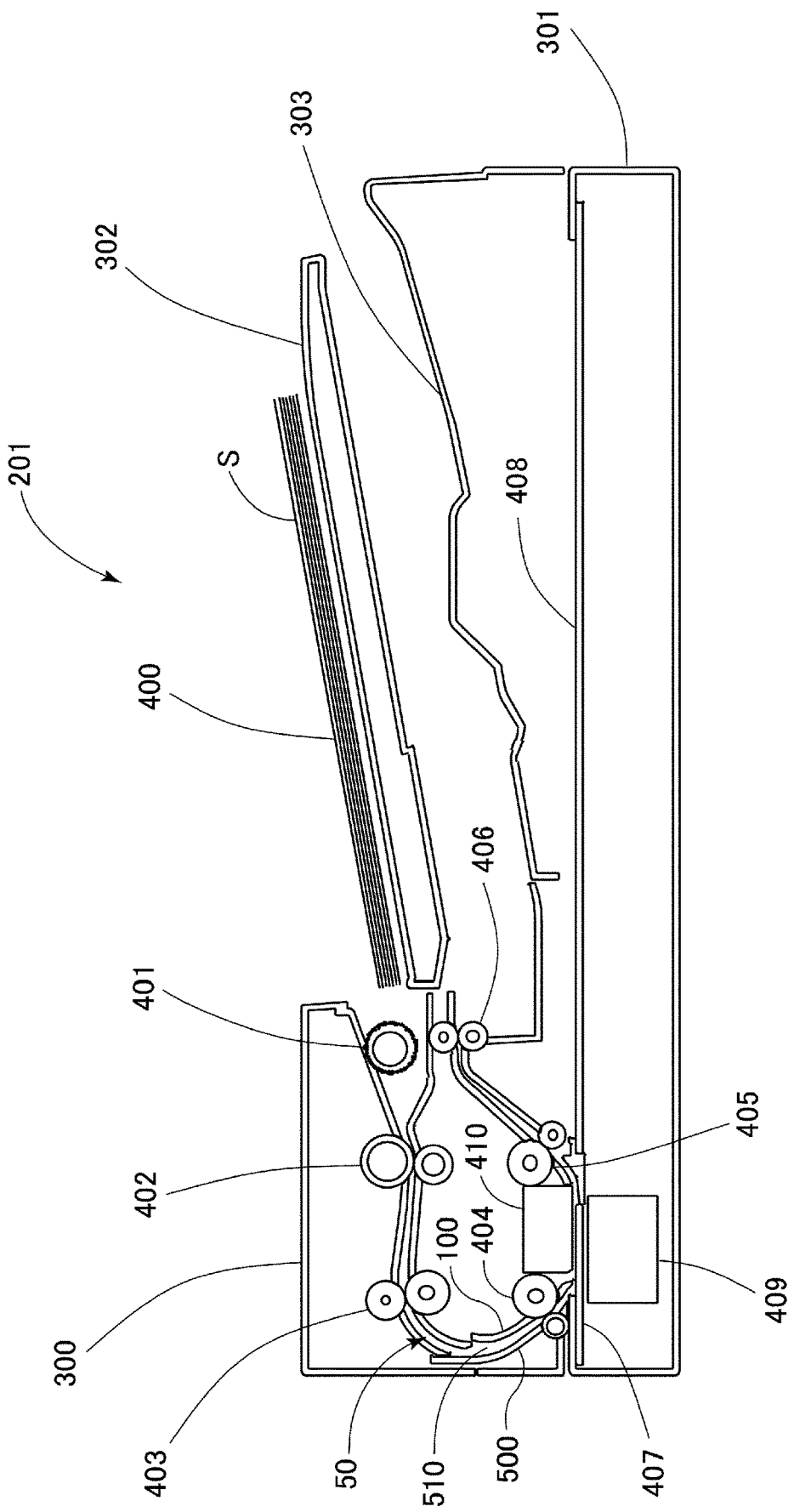
FIG. 3 is a sectional view of the image reading apparatus according to the embodiment.

FIG. 3 is a sectional view of the image reading apparatus 201. As shown in FIG. 3, the ADF 300 includes a pick-up roller 401 and a separation roller 402 which are used for separating and feeding a plurality of sheets of originals S stacked on the sheet feeding tray 302. The ADF 300 also includes a plurality of feeding rollers 403, 404, 405 and 406 for feeding the original S separated by the separation roller 402.

The feeding roller 403 is provided downstream of the separation roller 402 with respect to a feeding direction of the original S and draws the fed original S from the separation roller 402 and then feeds the original S into a feeding passage 50. The feeding roller 404 is provided downstream of the feeding roller 403 with respect to the feeding direction, and the feeding roller 405 is provided downstream of the feeding roller 404 with respect to the feeding direction. Further, on a side downstream of the feeding roller 405 with respect to the feeding direction, the feeding roller 406 is provided, and the original S on which the image is read by the reader 301 is discharged onto the sheet discharge tray 303 by the feeding roller 406.

Between the feeding rollers 403 and 404, a curved feeding passage 510 is formed by an inner guiding member 100 constituting an inside of the feeding passage 50 as seen in an axial direction of the feeding rollers and by outer guiding member 500 constituting an outside of the feeding passage 50 as seen in the axial direction. By providing the curved feeding passage 510, in the ADF 300, a direction in which the original S is fed can be changed, so that the feeding passage 50 in the ADF 300 can be shortened and thus the ADF 300 can be downsized. In the ADF 300, curvature of flexure of the curved feeding passage 510 is increased, so that a size of the ADF 300 with respect to a height direction can be reduced (downsized).

The feeding rollers 404 and 405 are provided for stably reading the original S by the reader 301. The feeding roller 405 rotates slightly faster than the feeding roller 404 (i.e., a peripheral speed of the feeding roller 405 is slightly higher than a peripheral speed of the feeding roller 404), and thus the feeding roller 405 feeds the original S so as to draw the original S toward a downstream side of the feeding direction, so that the original S is prevented from flexing (bending) in the feeding passage 50.

As shown in FIG. 3, the reader 301 includes a first reading unit 409 for reading an image off a front surface of the original S. The first reading unit 409 is provided in the reader 301 disposed under the ADF 300, and in the case where the original S is fed from the ADF 300, the first reading unit 409 is at rest in a position opposing a first skimming-through reading platen glass 407 and reads the image of the front surface of the original S through the first skimming-through reading platen glass 407. Further, in the case where the ADF 300 is opened, the first reading unit 409 moves on a rail (not shown) provided inside the reader 301 in a left right direction in FIG. 3, and reads an image on an original placed on an original supporting platen glass 408.

Figure 4:
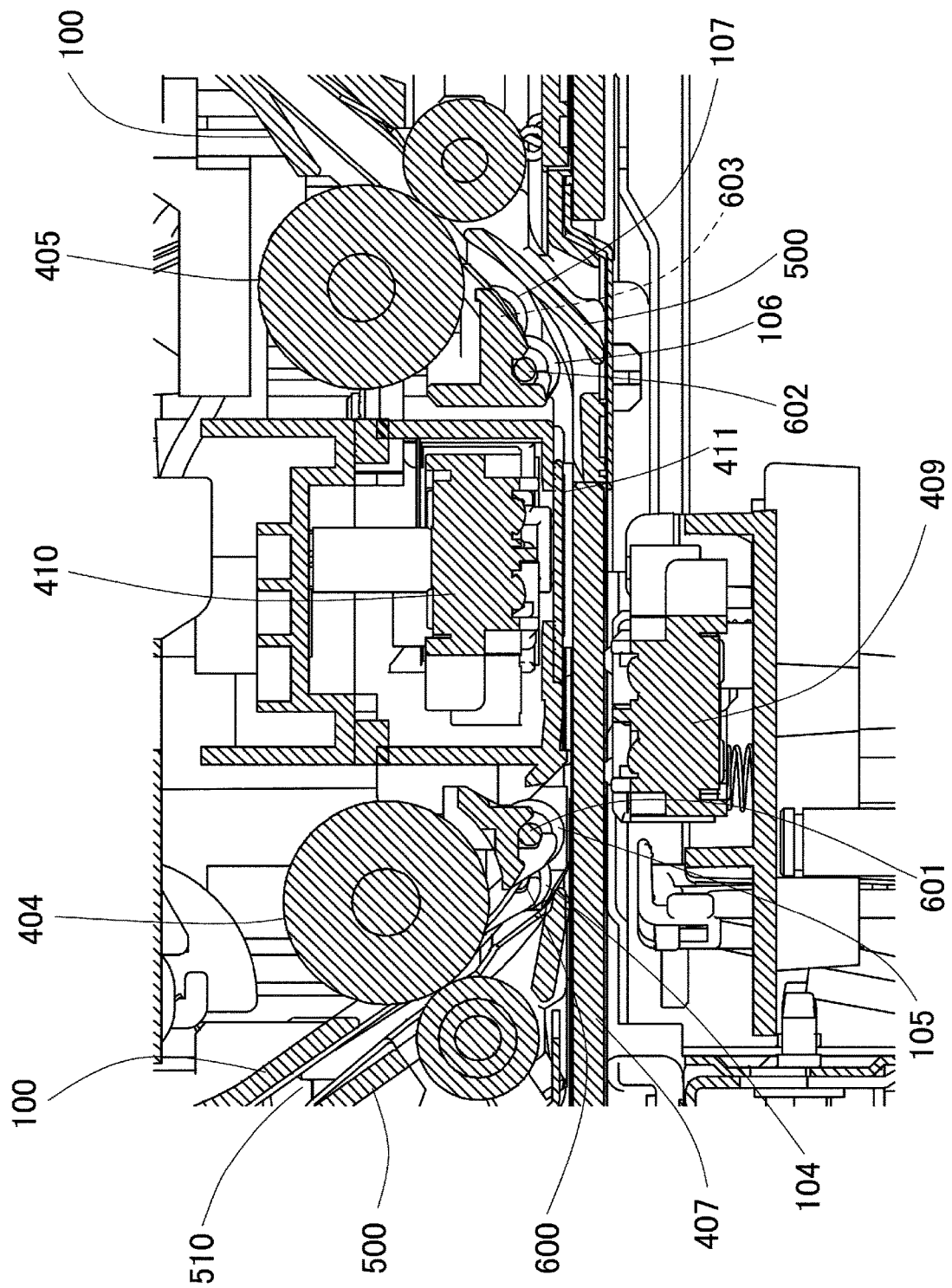
FIG. 4 is a sectional view showing a reading unit of the image reading apparatus according to the embodiment and the neighborhood thereof.

FIG. 4 is an enlarged sectional view of a portion of the ADF 300 in the neighborhood of the feeding rollers 404 and 405. As shown in FIG. 4, the ADF 300 includes a second reading unit 410 for reading an image of a back surface of the original S fed from the sheet feeding tray 302 through a second skimming-through reading platen glass 411. The second reading unit 410 is provided inside the ADF 300 and between the feeding rollers 404 and 405 and opposes the first reading unit 409 in the case where the first reading unit is at rest in the reading position opposing the first skimming-through reading platen glass 407.

Between the feeding rollers 404 and 405, the first reading unit 409 and the second reading unit 410 are disposed opposed to each other with respect to the feeding passage 50, so that the image reading apparatus 201 is capable of reading the images of the front surface and the back surface of the original S fed by the ADF 300.

Figure 5:
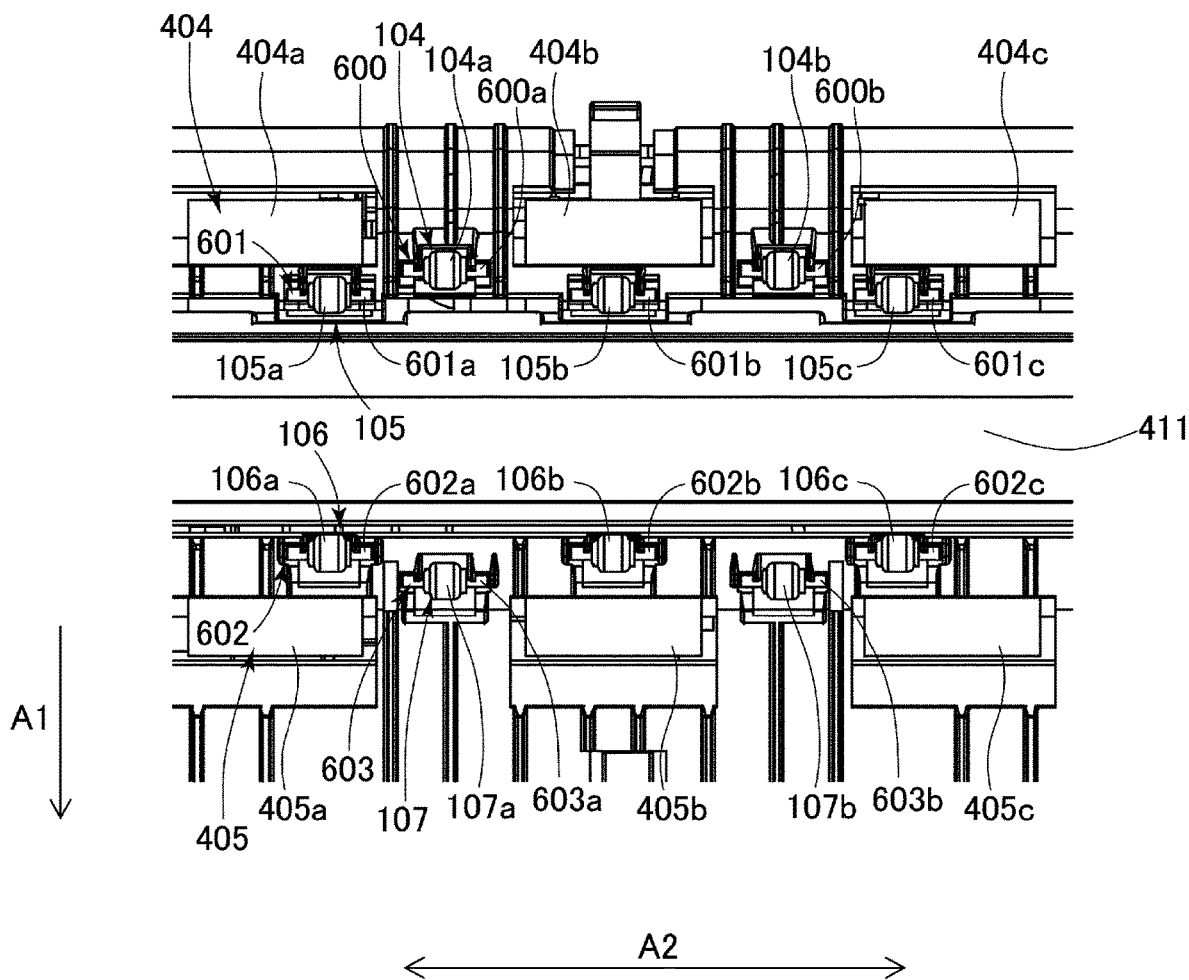
FIG. 5 is a front view showing the reading unit of the image reading apparatus according to the embodiment and the neighborhood thereof.

FIG. 5 is a front view of the feeding passage 50 in a position where the inner guiding member 100 and the second skimming-through reading platen glass 411 in the ADF 300 are disposed. First, with respect to a feeding direction A1, a constitution on a side upstream of the second skimming-through reading platen glass 411 will be described.

As shown in FIG. 5, the feeding roller 404 is disposed so as to include a rotation shaft extending in a direction perpendicular to the feeding direction A1. The feeding roller 404 includes rollers 404a, 404b and 404c disposed in a line with predetermined intervals (first intervals) therebetween along a direction A2 parallel to the axial direction of the feeding roller 404.

The inner guiding member 100 is provided with a first roller member 104a which includes a rotation shaft 600a, between the rollers 404a and 404b, parallel to the axial direction of the feeding roller 404 and which is rotatable. Further, the inner guiding member 100 is provided with a first roller member 104b which includes a rotation shaft 600b, between the rollers 404b and 404c, co-axial with the rotation shaft 600a and which is rotatable.

Further, the inner guiding member 100 is provided with second roller members 105a, 105b and 105c including rotation shafts 601a, 601b and 601c, respectively, on a side downstream of the feeding roller 404 with respect to the feeding direction A1 and in a position upstream of the second skimming-through reading platen glass 411 with respect to the feeding direction A1.

With respect to the direction A2, the second roller member 105a is disposed at an overlapping position with the roller 404a, the second roller member 105b is disposed at an overlapping position with the roller 404b, and the second roller member 105c is disposed at an overlapping position with the roller 404c. Further, the second roller members 105a, 105b and 105c are disposed downstream of the first roller members 104a and 104b with respect to the feeding direction A1.

That is, in the ADF 300, with respect to the direction A2, the second roller member 105a, the first roller member 104a, the second roller member 105b, the first roller member 104b and the second roller member 105c are provided on the inner guiding member 100 in a named order. In other words, in the ADF 300, the second roller members 105a, 105b and 105c and the first roller members 104a and 104b are disposed alternately at different positions with respect to the direction A2 and are disposed in non-overlapping directions with each other as seen in the feeding direction A1.

Further, as shown in FIG. 5, in the ADF 300, the first roller members 104a and 104b and the second roller members 105a, 105b and 105c are disposed on the inner guiding member 100 at different positions from each other with respect to the feeding direction A1.

Next, with respect to a feeding direction A1, a constitution on a side downstream of the second skimming-through reading platen glass 411 will be described.

As shown in FIG. 5, the feeding roller 404 includes rollers 405a, 405b and 405c disposed in a line with predetermined intervals (second intervals) therebetween along the direction A2.

Further, the inner guiding member 100 is provided with third roller members 106a, 106b and 106c including rotation shafts 602a, 602b and 602c, respectively, on a side upstream of the feeding roller 405 with respect to the feeding direction A1 and in a position downstream of the second skimming-through reading platen glass 411 with respect to the feeding direction A1.

With respect to the direction A2, the third roller member 106a is disposed at an overlapping position with the roller 405a, the third roller member 106b is disposed at an overlapping position with the roller 405b, and the third roller member 106c is disposed at an overlapping position with the roller 405c.

Further, the inner guiding member 100 is provided with a fourth roller member 107a which includes a rotation shaft 603a, between the rollers 405a and 405b, parallel to the axial direction of the feeding roller 405 and which is rotatable. Further, the inner guiding member 100 is provided with a fourth roller member 107b which includes a rotation shaft 603b, between the rollers 405b and 405c, co-axial with the rotation shaft 603a and which is rotatable. The fourth roller members 107a, 107b are disposed downstream of the first roller members 106a, 106b and 106c with respect to the feeding direction A1.

That is, in the ADF 300, with respect to the direction A2, the third roller member 106a, the fourth roller member 107a, the third roller member 106b, the fourth roller member 107b and the third roller member 106c are provided on the inner guiding member 100 in a named order. In other words, in the ADF 300, the third roller members 106a, 106b and 106c and the fourth roller members 107a and 107b are disposed alternately at different positions with respect to the direction A2 and are disposed in non-overlapping directions with each other as seen in the feeding direction A1.

Further, as shown in FIG. 5, in the ADF 300, the third roller members 106a, 106b and 106c and the fourth roller members 107a and 107b are disposed on the inner guiding member 100 at different positions from each other with respect to the feeding direction A1.

Incidentally, the first roller members 104a and 104b and the rotation shafts 600a and 600b have substantially the same constitution except that positions where these members are disposed are different from each other. In the following description, in the case where distinction is not particularly required, suffixes a and b added to the reference numerals are omitted, and these members will be collectively described as the first roller member 104 and the rotation shaft 600. Further, also as regards other roller members and other rotation shafts, substantially similarly, in the case where distinction is not particularly required, these members will be collectively described as the second roller member 105, the rotation shaft 601, the third roller member 106, the rotation shaft 602, the fourth roller member 107 and the rotation shaft 603.

Figure 6:
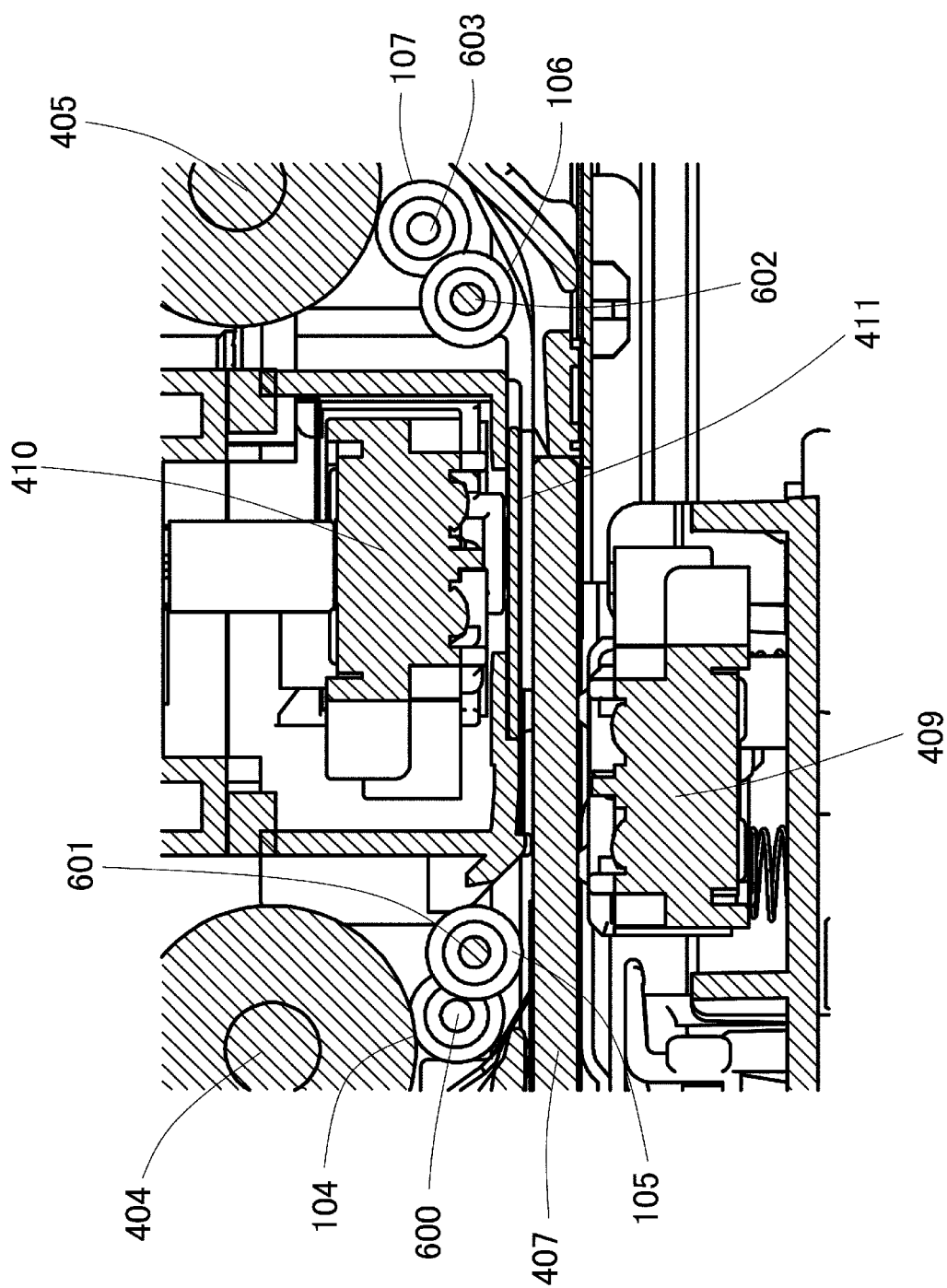
FIG. 6 is a sectional view showing the reading unit of the image reading apparatus according to the embodiment and the neighborhood thereof, from which an inner guiding member is omitted from illustration.

FIG. 6 is an enlarged sectional view of a portion in the neighborhood of the feeding rollers 404 and 405, in which the inner guiding member 100 of the ADF 300 is not illustrated. As shown in FIG. 6, in the case where the second roller member 105 is seen in the axial direction, outer peripheral surfaces of the first roller member 104 and the second roller member 105 are disposed in overlapping directions with each other with respect to the feeding direction. Further, in the case where the fourth roller member 107 is seen in the axial direction, outer peripheral surfaces of the second roller member 106 and the fourth roller member 107 are disposed in overlapping directions with each other with respect to the feeding direction.

Summary of this Embodiment

In the image reading apparatus 201, the inner guiding member 100 is provided with the first roller member 104 to the fourth roller member 107, so that a feeding load when the original S is slid on the inner guiding member 100 can be suppressed by the first roller member 104 to the fourth roller member 107. Here, in the image reading apparatus 201, with an increasing degree of curvature of flexure of the feeding passage 510, the original S fed along the feeding passage 50 is pressed in a larger degree against the first roller member 104 to the fourth roller member 107.

In the image reading apparatus 201, if the first roller member 104 and the second roller member 105 are disposed at the same position as seen in the feeding direction, the first roller member 104 and the second roller member 105 contact the original S at the same position with respect to a widthwise direction of the original S. By this, there is a liability that a stripe-shaped recess due to the first roller member 104 and the second roller member 105 is generated on the original S. Further, in the image reading apparatus 201, if the third roller member 106 and the fourth roller member 107 are disposed at the same position as seen in the feeding direction, similarly, there is a liability that a stripe-shaped recess due to the third roller member 106 and the fourth roller member 107 is generated on the original S.

In the image reading apparatus 201, in the case where the stripe-shaped recesses due to the first roller member 104 to the fourth roller member 107 generated on the original S, it becomes difficult to stably feed the original S and to read the image, formed on the original S, with a satisfactory image quality.

In the image reading apparatus 201 of this embodiment, the first roller member 104 and the second roller member 105 are disposed between the feeding roller 404 and the second reading unit 410. Further, the first roller members 104*a* and 104*b* are disposed on the rotation shafts 600*a* and 600*b* in non-overlapping directions with the second roller members 105*a* and 105*c* as seen in the feeding direction A1. Further, the second roller members 105*a* to 105*c* are disposed on the rotation shafts 601*a* to 601*c* in non-overlapping directions with the first roller members 104*a* and 104*b* as seen in the feeding direction A1.

Further, in the image reading apparatus 201 of this embodiment, the third roller member 106 and the fourth roller member 107 are disposed between the feeding roller 405 and the second reading unit 410. Further, the third roller members 106*a* to 106*c* are disposed on the rotation shafts 602*a* to 602*c* in non-overlapping directions with the fourth roller members 107*a* and 107*b* as seen in the feeding direction A1. Further, the fourth roller members 107*a* and 107*b* are disposed on the rotation shafts 603*a* and 603*b* in non-overlapping directions with the third roller members 106*a* to 106*b* as seen in the feeding direction A1.

By such a constitution, in the image reading apparatus 201, the first roller member 104 and the second roller member 105 contact the fed original S at different positions, and the third roller member 106 and the fourth roller member 107 contact the fed original at different positions.

The first roller member 104 constitutes a first driven rolling member in this embodiment, and the rotation shaft 600 of the first roller member 104 constitutes a first shaft in this embodiment. The second roller member 105 constitutes a second driven rolling member in this embodiment, and the rotation shaft 601 of the second roller member 105 constitutes a second shaft in this embodiment.

The third roller member 106 constitutes a third driven rolling member in this embodiment, and the rotation shaft 602 of the third roller member 106 constitutes a third shaft in this embodiment. The fourth roller member 107 constitutes a fourth driven rolling member in this embodiment, and the rotation shaft 603 of the fourth roller member 107 constitutes a fourth shaft in this embodiment.

Further, the first reading unit 409 for reading the image of the front surface which is one surface of the original S as the sheet and the second reading unit 410 for reading the image of the back surface which is the other surface of the original S constitute a reading unit in this embodiment. Further, the feeding roller 404 provided on a side upstream of the second reading unit 410 constitutes a first rotatable feeding member in this embodiment, and the plurality of rollers 404*a* to 404*c* of the feeding roller 404 constitute a plurality of rollers and a plurality of first rollers. Further, the feeding roller 405 provided on a side downstream of the second reading unit 410 constitutes a second rotatable feeding member in this embodiment, and the plurality of rollers 405*a* to 405*c* of the feeding roller 405 constitutes a plurality of second rollers.

As described above, in the image reading apparatus 201 of this embodiment, the first roller member 104 and the second roller member 105 contact the fed original S at different positions with respect to the axial direction of the feeding roller 404. For this reason, the image reading apparatus 201 can suppress the occurrence of the stripe-shaped recess of the original S due to the first roller member 104 and the second roller member 105. Further, in the image reading apparatus 201, the first roller member 104 and the second roller member 105 contact the original S at different positions also with respect to the feeding direction. By such a constitution, the image reading apparatus 201 stabilizes the attitude of the fed original S and is capable of realizing stable feeding of the original S. Further, the image reading apparatus 201 is capable of reading the image from the original S, stabilized in attitude, with a good image quality when the image formed on the original S is read by the first reading unit 409 and the second reading unit 410 which are positioned on a side downstream of the second roller member 105.

Further, in the image reading apparatus 201 of this embodiment, the third roller member 106 and the fourth roller member 107 contact the fed original S at different positions with respect to the axial direction of the feeding roller 405. For this reason, the image reading apparatus 201 can suppress the occurrence of the stripe-shaped recess of the original S due to the third roller member 106 and the fourth roller member 107. Further, in the image reading apparatus 201, the third roller member 106 and the fourth roller member 107 contact the original S at different positions also with respect to the feeding direction. By such a constitution, the image reading apparatus 201 is capable of realizing stable feeding of the original S. Further, the image reading apparatus 201 is capable of reading the image from the original S with a good image quality when the image formed on the original S is read by the first reading unit 409 and the second reading unit 410 which are positioned on a side upstream of the third roller member 106.

Further, in the image reading apparatus 201, between the feeding roller 404 and the second reading unit 410, the first roller member 104 and the second roller member 105 are disposed at positions where the outer peripheral surfaces of the first roller member 104 and the second roller member 105 overlap with each other.

By this constitution, the image reading apparatus 201 is capable of saving a space necessary to provide the first roller member 104 and the second roller member 105 therein, and is capable of preventing upsizing thereof by providing the first roller member 104 and the second roller member 105 in the space.

Further, in the image reading apparatus 201, between the feeding roller 405 and the second reading unit 410, the third roller member 106 and the fourth roller member 107 are disposed at positions where the outer peripheral surfaces of the third roller member 106 and the fourth roller member 107 overlap with each other.

By this constitution, the image reading apparatus 201 is capable of saving a space necessary to provide the third roller member 106 and the fourth roller member 107 therein, and is capable of preventing upsizing thereof by providing the third roller member 106 and the fourth roller member 107 in the space.

Incidentally, the image reading apparatus 201 includes the two first roller members 104*a* and 104*b* and the three second roller members 105*a* to 105*c*, but the present invention is not limited thereto. The image reading apparatus 201 may only be required to include at least one first roller member and at least one second roller member. In the case where the image reading apparatus 201 is constituted so as to include a single first roller member and a single second roller member, in the image reading apparatus 201, the single first roller member and the single second roller member are provided at different positions with respect to the axial direction. Further, as seen in the feeding direction, the single first roller member is disposed on the first shaft at a position where the single second roller member is not disposed, and the single second roller member is disposed on the second shaft at a position where the single first roller member is not disposed.

Further, in this embodiment, in the image reading apparatus 201, both the two first roller members 104*a* and 104*b* are disposed on the rotation shafts 600*a* and 600*b* at positions where the three second roller members 105*a* to 105*c* are not disposed. Further, in the image reading apparatus 201, all the three second roller members 105a to 105c are disposed on the rotation shafts 601a to 601c at positions where the two first roller members 104a and 104b are not disposed. The constitution of the image reading apparatus 201 is not limited to the above-described constitutions, but may only be required that at least one first roller member is disposed on the first shaft at a position where the second roller member is not disposed and that at least one second roller member is disposed on the second shaft at a position where the first roller member is not disposed.

Further, the image reading apparatus 201 includes the three third roller members 106a to 106c and the two fourth roller members 107a and 107b, but the present invention is not limited thereto. The image reading apparatus 201 may only be required to include at least one third roller member and at least one fourth roller member. In the case where the image reading apparatus 201 is constituted so as to include a single third roller member and a single fourth roller member, in the image reading apparatus 201, the single third roller member and the single fourth roller member are provided at different positions with respect to the axial direction. Further, as seen in the feeding direction, the single third roller member is disposed on the third shaft at a position where the single fourth roller member is not disposed, and the single fourth roller member is disposed on the fourth shaft at a position where the single third roller member is not disposed.

Further, in this embodiment, in the image reading apparatus 201, all the three third roller members 106a to 106c are disposed on the rotation shafts 602a to 602c at positions where the two fourth roller members 107a and 107b are not disposed. Further, in the image reading apparatus 201, both the two fourth roller members 107a and 107b are disposed on the rotation shafts 603a and 603b at positions where the three third roller members 106a to 106c are not disposed. The constitution of the image reading apparatus 201 is not limited to the above-described constitutions, but may only be required that at least one third roller member is disposed on the third shaft at a position where the fourth roller member is not disposed and that at least one fourth roller member is disposed on the fourth shaft at a position where the third roller member is not disposed.

Further, in this embodiment, the image reading apparatus 201 includes independent two rotation shafts co-axial with each other and consisting of the rotation shaft 600a on which the first roller member 104a is disposed and of the rotation shaft 600b on which the first roller member 104b is disposed, but the present invention is not limited thereto. The image reading apparatus 201 may also be constituted so that for example, the first roller member 104a and the first roller member 104b are disposed on a single rotation shaft. Further, the image reading apparatus 201 may also be constituted so that also are regards each of pluralities the second roller members 105 to the fourth roller members 107, substantially similar to the case of the first roller members 104, a constitution in which each of pluralities of the second roller members 105 to the fourth roller members 107 is disposed on associated single shaft of the second shaft to the fourth shaft may also be employed.

Further, in this embodiment, between the feeding roller 404 and the second reading unit 410, the first roller member 104 and the second roller member 105 are disposed, and between the feeding roller 405 and the second reading unit 410, the third roller member 106 and the fourth roller member 107 are disposed, but the present invention is not limited thereto. The image reading apparatus 201 may also be constituted so that between the feeding roller 404 and the second reading unit 410, the first roller member 104 and the second roller member 105 are disposed but so that between the feeding roller 405 and the second reading unit 410, the driven rolling members are not disposed.

Further, the image reading apparatus 201 may also be constituted so that between the feeding roller 405 and the second reading unit 410, the third roller member 106 and the fourth roller member 107 are disposed but so that between the feeding roller 405 and the second reading unit 410, the driven rolling members are not disposed. In the case of such a constitution, the feeding roller 405 constitutes the rotatable feeding member, the third roller member 106 constitutes the first driven rolling member, and the rotation shaft 602 of the third roller member 106 constitutes the first shaft. Further, the fourth roller member 107 constitutes the second driven rolling member, and the rotation shaft 603 of the fourth roller member 107 constitutes the second shaft.

Further, in this embodiment, in the image reading apparatus 201, the second roller members 105a to 105c and the first roller members 104a and 104b are alternately disposed at different positions with respect to the axial direction of the feeding roller 404, but the present invention is not limited thereto. In the image reading apparatus 201, for example, these roller members may also be disposed in the order of the second roller member, the first roller member, the first roller member and the second roller member with respect to the axial direction, and may only be required to be disposed at positions different from each other.

Further, in the image reading apparatus 201, the third roller members 106a to 106c and the fourth roller members 107a and 107b are alternately disposed at different positions with respect to the axial direction of the feeding roller 404, but the present invention is not limited thereto. In the image reading apparatus 201, for example, these roller members may also be disposed in the order of the third roller member, the fourth roller member, the fourth roller member and the third roller member with respect to the axial direction, and may only be required to be disposed at positions different from each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-017441 filed on Feb. 4, 2020, which is hereby incorporated by reference herein in its entirety.

What is claimed is:

1. An image reading apparatus comprising:
a rotatable feeding member configured to feed a sheet;
a reading unit configured to read, at a reading position, an image on a first surface of the sheet fed by said rotatable feeding member;
a feeding guide configured (a) to define an inside of a curved feeding passage as seen in an axial direction of said rotatable feeding member and (b) to face a second surface, opposite to the first surface, of the sheet fed by said rotatable feeding member;
a first roller provided between said rotatable feeding member and the reading position with respect to the feeding direction, said first roller being rotatable by contact with the second surface of the sheet fed by said rotatable feeding member; and
a second roller provided between said rotatable feeding member and the reading position with respect to the feeding direction, said second roller including a rotation center provided downstream of a rotation center of said first roller with respect to the feeding direction, wherein said second roller is rotatable by contact with the second surface of the sheet fed by said rotatable feeding member, wherein a part of said first roller and a part of said second roller are provided (a) so as to overlap each other as seen in the axial direction and (b) so as not to overlap each other as seen in the feeding direction.

2. An image reading apparatus according to claim 1, wherein said first roller is provided on a first shaft parallel to the axial direction, and wherein said second roller is provided on a second shaft parallel to the axial direction and downstream of said first shaft with respect to the feeding direction.

3. An image reading apparatus according to claim 2, wherein said first roller comprises a plurality of first roller members provided on said first shaft, wherein said second roller comprises a plurality of second roller members provided on said second shaft, and wherein said first roller members and said second roller members are provided so as not to overlap each other as seen in the feeding direction.

4. An image reading apparatus according to claim 3, wherein said first roller members and said second roller members are alternately provided with respect to the axial direction.

5. An image forming apparatus according to claim 1, wherein said first roller and said second roller are provided at positions where an outer peripheral line of said first roller and an outer peripheral line of said second roller cross each other, as seen in the axial direction.

6. An image reading apparatus according to claim 1, wherein said rotatable feeding member comprises a plurality of rotatable members rotating in contact with the sheet with predetermined intervals, wherein said first roller is provided at a non-overlapping position with said rotatable members as seen in the feeding direction, and wherein said second roller is provided at an overlapping position with said rotatable members with respect to the axial direction as seen in the feeding direction.

7. An image reading apparatus according to claim 1, wherein said rotatable feeding member, said feeding guide, said first roller, and said second roller are provided upstream of said reading unit with respect to the feeding direction.

8. An image reading apparatus according to claim 1, wherein said rotatable feeding member, said feeding guide, said first roller, and said second roller are provided downstream of said reading unit with respect to the feeding direction.

9. An image reading apparatus according to claim 1, wherein said rotatable feeding member is a first rotatable feeding member provided on a side upstream of the reading position with respect to the feeding direction, wherein said feeding guide is a first feeding guide provided on a side upstream of the reading position with respect to the feeding direction, wherein said image reading apparatus further comprises:

(a) a second rotatable feeding member provided on a side downstream of the reading position with respect to the feeding direction, (b) a second feeding guide provided on a side downstream of the reading position with respect to the feeding direction, said second feeding guide being configured to face the second surface of the sheet fed by said second rotatable feeding member, (c) a third roller provided on a side downstream of the reading position with respect to the feeding direction, said third roller including a rotation center provided on a third shaft parallel to the axial direction, wherein said third roller is rotatable by contact with the second surface of the sheet fed by said second rotatable feeding member, and (d) a fourth roller provided on a side downstream of the reading position with respect to the feeding direction, said fourth roller including a rotation center provided on a fourth shaft parallel to the axial direction and positioned downstream of said third shaft with respect to the feeding direction, wherein said fourth roller is rotatable by contact with the second surface of the sheet fed by said second rotatable feeding member, and wherein said third roller and said fourth roller are provided (a) so as to overlap each other as seen in the axial direction and (b) so as not to overlap each other as seen in the feeding direction.

10. An image reading apparatus according to claim 9, wherein said third roller comprises a plurality of third roller members provided on said third shaft, wherein said fourth roller comprises a plurality of fourth roller members provided on fourth second shaft, and wherein said third roller members and said fourth roller members are provided in non-overlapping directions as seen in the feeding direction.

11. An image reading apparatus according to claim 10, wherein said third roller members and said fourth roller members are alternately provided with respect to the axial direction.

12. An image forming apparatus according to claim 9, wherein said fourth roller is provided at a position where an outer peripheral line of said third roller and an outer peripheral line of said fourth roller cross each other with respect to the feeding direction as seen in the axial direction.

13. An image reading apparatus according to claim 9, wherein said first rotatable feeding member comprises a plurality of first rotatable members rotating in contact with the sheet with first intervals, wherein said second rotatable feeding member comprises a plurality of second rotatable members rotating in contact with the sheet with second intervals, wherein said third driven rolling member roller is provided at an overlapping position with said first rotatable members and said second rotatable members as seen in the feeding direction, and wherein said fourth roller is provided at a non-overlapping position with said first rotatable members and said second rotatable members as seen in the feeding direction.

14. An image reading apparatus according to claim 9, wherein a peripheral speed of said second rotatable feeding member is set at a value faster than a peripheral speed of said first rotatable feeding member, and wherein said first to fourth rollers are rotated by contact of the second surface of the sheet, fed by said first and second rotatable feeding members, with said first to fourth rollers.

15. An image reading apparatus according to claim 1, wherein said reading unit includes (a) a first reading unit configured to read an image on the first surface of the sheet and (b) a second reading unit configured to read an image on the second surface of the sheet.

16. An image forming apparatus comprising:
an image reading apparatus according to claim 1; and
an image forming portion configured to form an image, read by said image reading apparatus, on a recording material.

* * * * *